United States Patent
Bulkowski et al.

(10) Patent No.: US 10,599,677 B2
(45) Date of Patent: Mar. 24, 2020

(54) METHODS AND SYSTEMS OF SPLITTING DATABASE INDEXES AND DIGESTS

(71) Applicants: Brian J. Bulkowski, Menlo Park, CA (US); Andrew Gooding, Mountain View, CA (US); Venkatachary Srinivasan, Sunnyvale, CA (US)

(72) Inventors: Brian J. Bulkowski, Menlo Park, CA (US); Andrew Gooding, Mountain View, CA (US); Venkatachary Srinivasan, Sunnyvale, CA (US)

( * ) Notice: Subject to any disclaimer, the term of this patent is extended or adjusted under 35 U.S.C. 154(b) by 739 days.

(21) Appl. No.: 15/000,372

(22) Filed: Jan. 19, 2016

(65) Prior Publication Data
US 2016/0239529 A1  Aug. 18, 2016

Related U.S. Application Data

(60) Provisional application No. 62/106,226, filed on Jan. 22, 2015.

(51) Int. Cl.
*G06F 16/00* (2019.01)
*G06F 16/27* (2019.01)
*G06F 16/23* (2019.01)

(52) U.S. Cl.
CPC ........ *G06F 16/278* (2019.01); *G06F 16/2308* (2019.01)

(58) Field of Classification Search
CPC ......... G06F 17/30097; G06F 17/30094; G06F 17/30336; G06F 17/30584; G06F 17/30321; G06F 17/30327; G06F 17/30333; G06F 17/30613; G06F 16/244; G06F 11/3006; G06F 16/284; G06F 16/137; G06F 16/2308; G06F 16/278; H04L 9/3236
See application file for complete search history.

(56) References Cited

U.S. PATENT DOCUMENTS

| | | | | |
|---|---|---|---|---|
| 6,105,133 | A * | 8/2000 | Fielder | H04L 9/0891 380/283 |
| 9,935,951 | B2 * | 4/2018 | Spilman | G06F 21/602 |
| 2009/0307640 | A1 * | 12/2009 | Chapman | G06F 17/5045 716/136 |
| 2010/0043057 | A1 * | 2/2010 | Di Battista | G06F 16/284 726/2 |
| 2011/0161372 | A1 * | 6/2011 | Jones | H03M 7/3084 707/795 |
| 2012/0324241 | A1 * | 12/2012 | Oshida | G06F 21/73 713/189 |
| 2013/0287210 | A1 * | 10/2013 | Matsuda | H04L 9/0894 380/44 |
| 2014/0052704 | A1 * | 2/2014 | Mittal | G06F 16/2228 707/696 |
| 2015/0254330 | A1 * | 9/2015 | Chan | G06F 16/285 707/613 |

* cited by examiner

*Primary Examiner* — Merilyn P Nguyen

(57) ABSTRACT

A computer-implemented method of a distributed database system includes generating a database index. The method includes mapping a first specified number of bits of the database index to a database key. The method includes mapping a second specified number of bits to a data object associated with the database key. The method includes storing the first specified number of bits of the database key in a dram memory. The method includes storing second specified number of bits with the data object in a solid-state device (SSD) storage.

12 Claims, 8 Drawing Sheets

METHODS AND SYSTEMS OF SPLITTING DATABASE INDEXES AND DIGESTS

CROSS-REFERENCE TO RELATED APPLICATIONS

This application is a claims priority from U.S. Provisional Application No. 62/106,226, titled METHODS AND SYSTEMS OF SPLITTING DATABASE INDEXES AND DIGESTS, and filed 22 Jan. 2015. This application is hereby incorporated by reference in its entirety.

BACKGROUND OF THE INVENTION

1. Field

This application relates generally databases, and more particularly to a system and method of splitting database indexes and digests.

2. Related Art

A distributed database system (DDBS) can store database indexes and digests. These indexes and digests can take significant storage space in the DDBS. Decreasing this storage space and increase the efficiency of the DDBS. Thus, a method and system are desired for a system and method of splitting database indexes and digests.

BRIEF SUMMARY OF THE INVENTION

In one aspect computer-implemented method of a database includes the step of assigning a unique key to a record of a database. The method includes the step of hashing the unique key into a digest. The method includes the step of randomizing the digest. The method includes the step of storing the digest in an index tree. The method includes the step of assigning each index element to a node in the index tree. The method includes the step of assigning twelve (12) bits of the digest to store information that determines which partitions to assign a record. The method includes the step of assigning ix (6) bits of the digest to store information that determines which storage device on which to store the record. The method includes the step of assigning fourteen (14) bits to store information that determines a record lock to use on the record.

In another aspect, computer-implemented method of a database includes assigning a unique key to a record of a database. The method includes the step of hashing the unique key into a digest. The method includes the step of randomizing the digest. The method includes the step of storing the digest in an index tree. The method includes the step of assigning each index element to a node in the index tree. The method includes the step of assigning a first specified number of bits of the digest to store information that determines which partitions to assign a record. The method includes the step of assigning a second specified number of bits of the digest to store information that determines which storage device on which to store the record. The method includes the step of assigning a third specified number of bits to store information that determines a record lock to use on the record.

In yet another aspect, a computer-implemented method of a distributed database system includes generating a database index. The method includes mapping a first specified number of bits of the database index to a database key. The method includes mapping a second specified number of bits to a data object associated with the database key. The method includes storing the first specified number of bits of the database key in a dram memory. The method includes storing second specified number of bits with the data object in a solid-state device (SSD) storage.

Figure 1A:
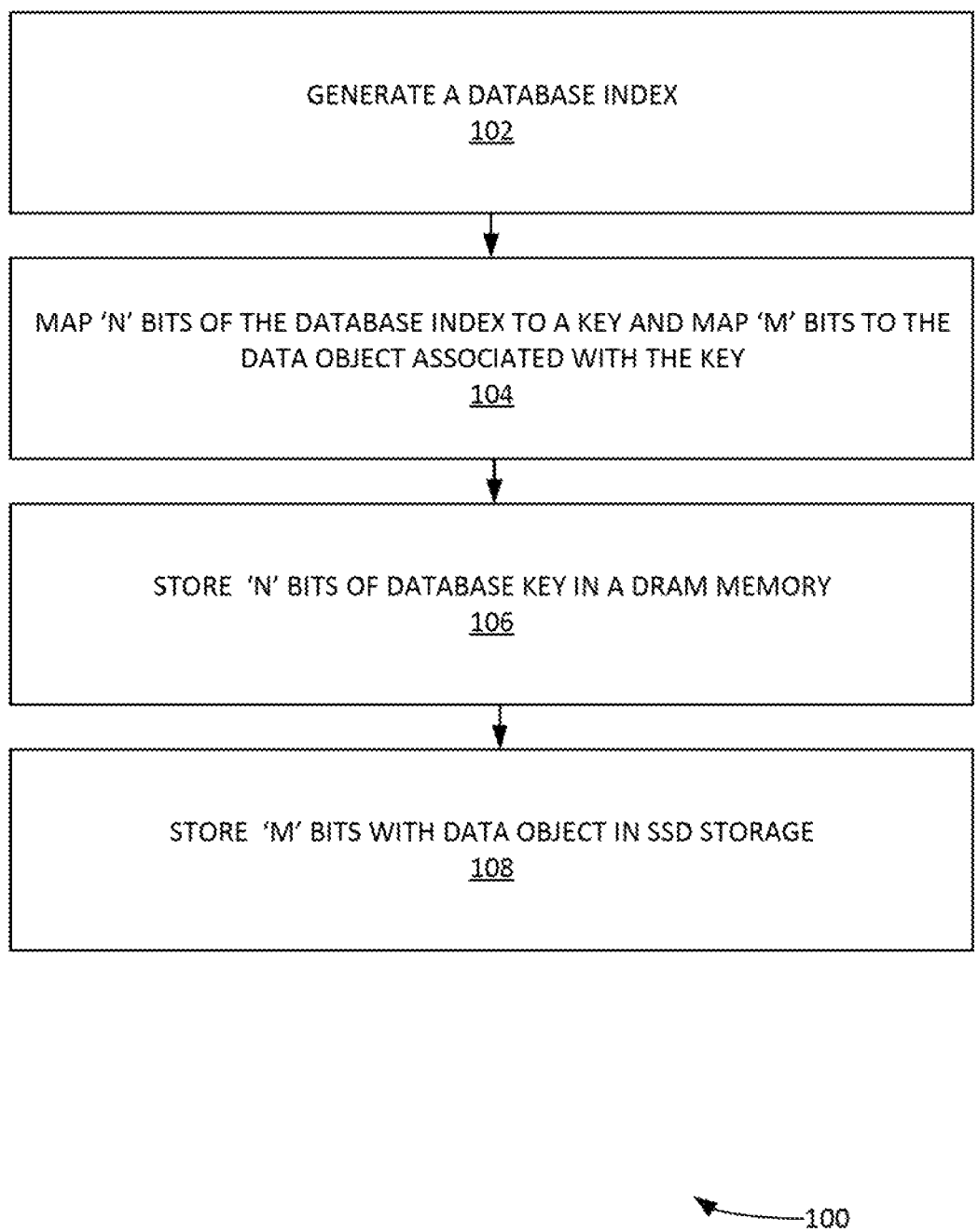
FIG. 1A illustrates an example process of splitting a database index, according to some embodiments.

The Figures described above are a representative set, and are not an exhaustive with respect to embodying the invention.

DESCRIPTION

Disclosed are a system, method, and article of manufacture of splitting database indexes and digests. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Dynamic random-access memory (DRAM) can be a type of random-access memory that stores each bit of data in a separate capacitor within an integrated circuit.

Mutex (mutual exclusion object) is a program object, that is created so that multiple program thread can take turns sharing the same resource.

Record locking can be a technique of preventing simultaneous access to data in a database, to prevent inconsistent results.

Solid-state drive (SSD) can be a data storage device using integrated circuit assemblies as memory to store data persistently.

EXEMPLARY METHODS

FIG. 1A illustrates an example process 100 of splitting a database index, according to some embodiments. In step 102, a database index can be generated. The database index can include information such as, inter alia: hash table information, data object location, etc. in step 104, 'n' bits of the database index can be mapped to a key. The key can identify a data object. Additionally, 'm' bits of the database index can be mapped (e.g. at the bin level) to a data object associated with the key. In this way, the 'n' bits can be used to determine and locate a data object in SSD-based storage (and/or a disk storage system). The 'm' bits can then be utilized to determine a relevant portion of the data object to be looked up for a database operation (e.g. a read or write operation).

In step 105, the 'n' bits can be stored as a database key in DRAM memory as the database key. In step 108, the 'm' bits can be stored in an SSD-based storage system (or other disk storage system) with the data object associated with the database key.

Figure 1B:
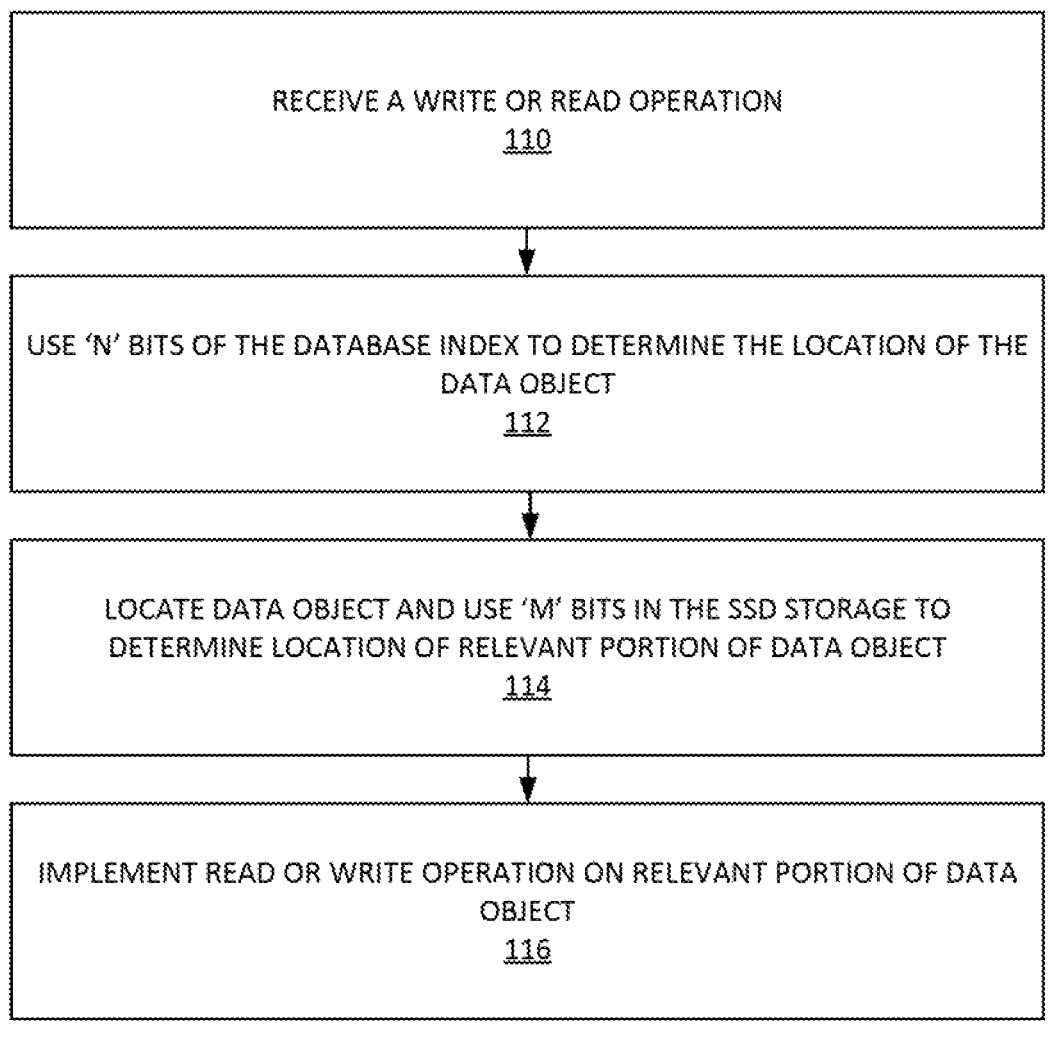
FIG. 1B illustrates a continuation of process of FIG. 1A, according to some embodiments.

FIG. 1B illustrates a continuation of process 100, according to some embodiments. More specifically, FIG. 19 illustrates an example operation that looks up a relevant portion of a data object in an SSD-based storage system for a database operation. In step 110, a database operation, such as a read or write operation, can be received. In step 112, the 'n' bits of the database key can be used to determine the identity and location of the data object. In step 114, the data object can be located and accessed in the DRAM memory. The 'm' bits can also be located and accessed in the SSD storage. The bits can be used to determine the location of the relevant portion of the data object (e.g. the data item). In step 116, the database operation can be implemented on the relevant portion of the data object.

Figure 2:
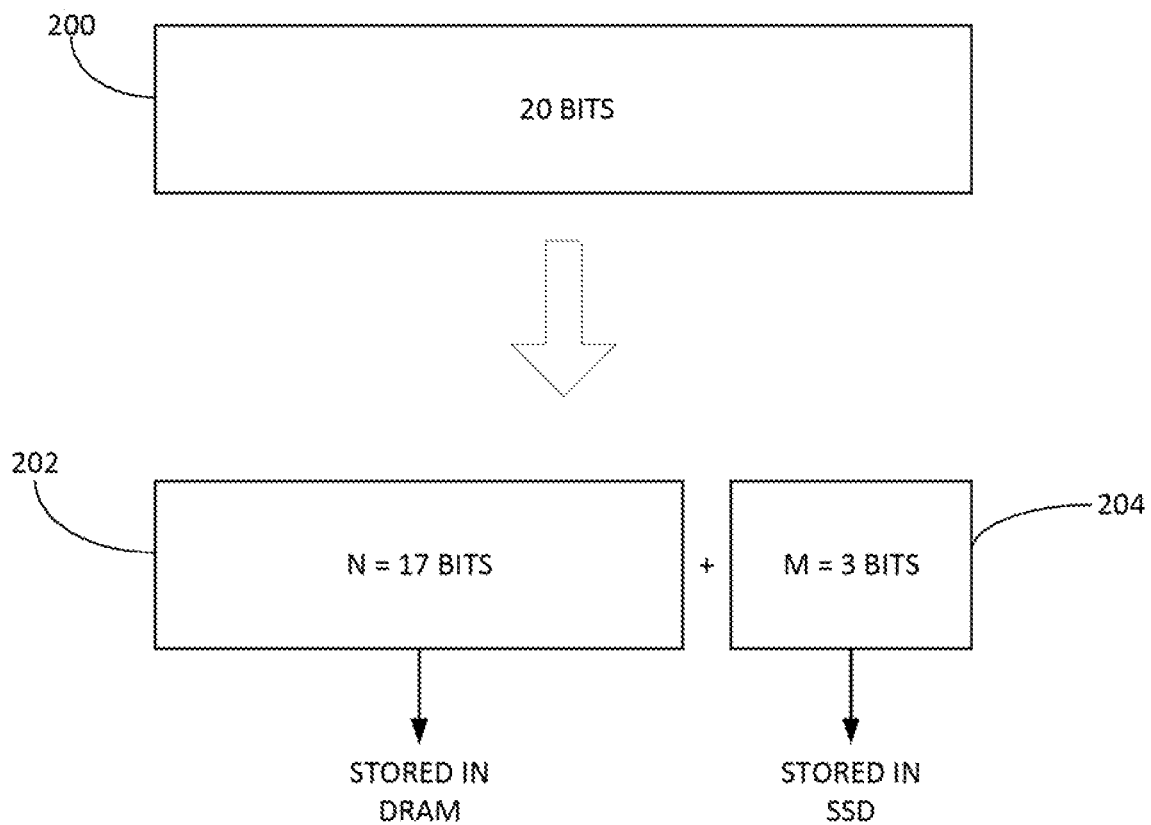
FIG. 2 illustrates an example division of a twenty-bit database index, according to some embodiments.

FIG. 2 illustrates an example division of a twenty (20) byte portion of a database index, according to some embodiments. In one example, the database index 200 can be twenty (20) bits. The 'n' bits of the hash table information and data object location can be seventeen (17) bits 202. The 'm' bits of the location of the relevant portion of the data object can be three (3) bits 204. Accordingly, the seventeen (17) bits 202 can be stored as a key in DRAM memory and the three (3) bits 204 stored in the SSD storage. The single bit database key 202 can be used to determine the location of multiple data items in a data object. The particular data items can then be identified with the relevant 'm' bits.

A two-level look up can be utilized to locate the relevant portion of the data object. For example, the index (e.g. the 17-bit database key) can be looked up in DRAM. The portion of the index in DRAM can identify the data object and relevant block of SSD storage. The block can be fetched from SSD storage. Using the portion of the index in the SSD storage (e.g. with the 3-bits that identify the relevant portion of the data object), another look up in the block can be performed and a database operation can then be performed on the real data.

In this way, a database index can use less DRAM memory. It is noted that, in some embodiments, process 100 can be implemented at the application level. Process 100 can be used on a key space to batch multiple keys into a big object. Process 100 can be implemented in petabyte-sized databases.

Figure 3:
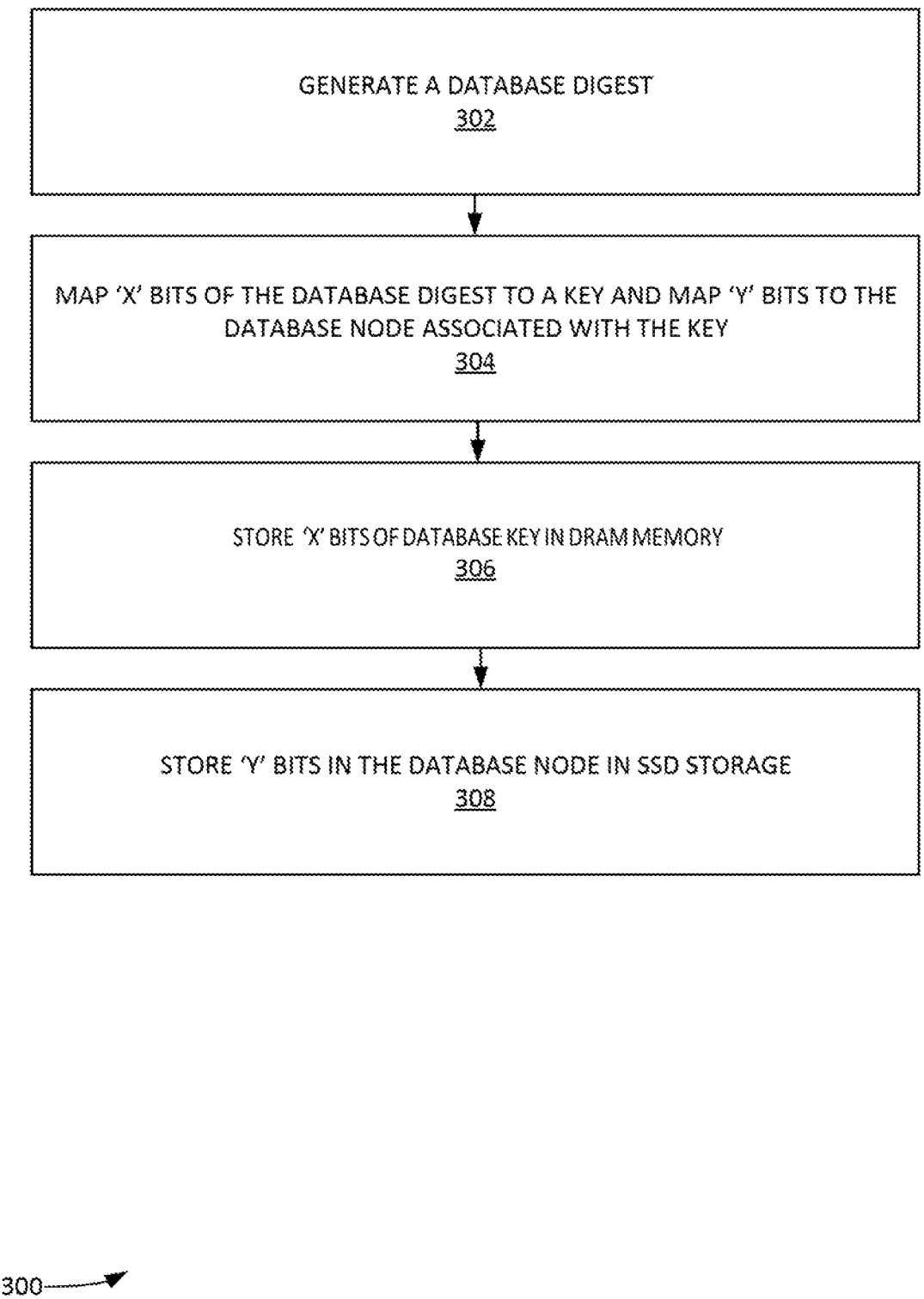
FIG. 3 illustrates an example process of splitting a database digest, according to some embodiments.

FIG. 3 illustrates an example process 300 of splitting a database digest, according to some embodiments. At the database level, a digest can be used to access a particular node for database-related operations. A portion of the digest can determine the relevant part of the node. Accordingly, in step 302, a database digest can be generated. In step 304, 'x' number bits of the database digest can be mapped to a key. Additionally, 'y' number of bits of the database digest can be mapped to a database node associated with the key. In step 306, the 'x' bits of the database key can be stored in DRAM memory. In step 308, the 'y' bits of the database node can be stored in SSD storage.

Figure 4:
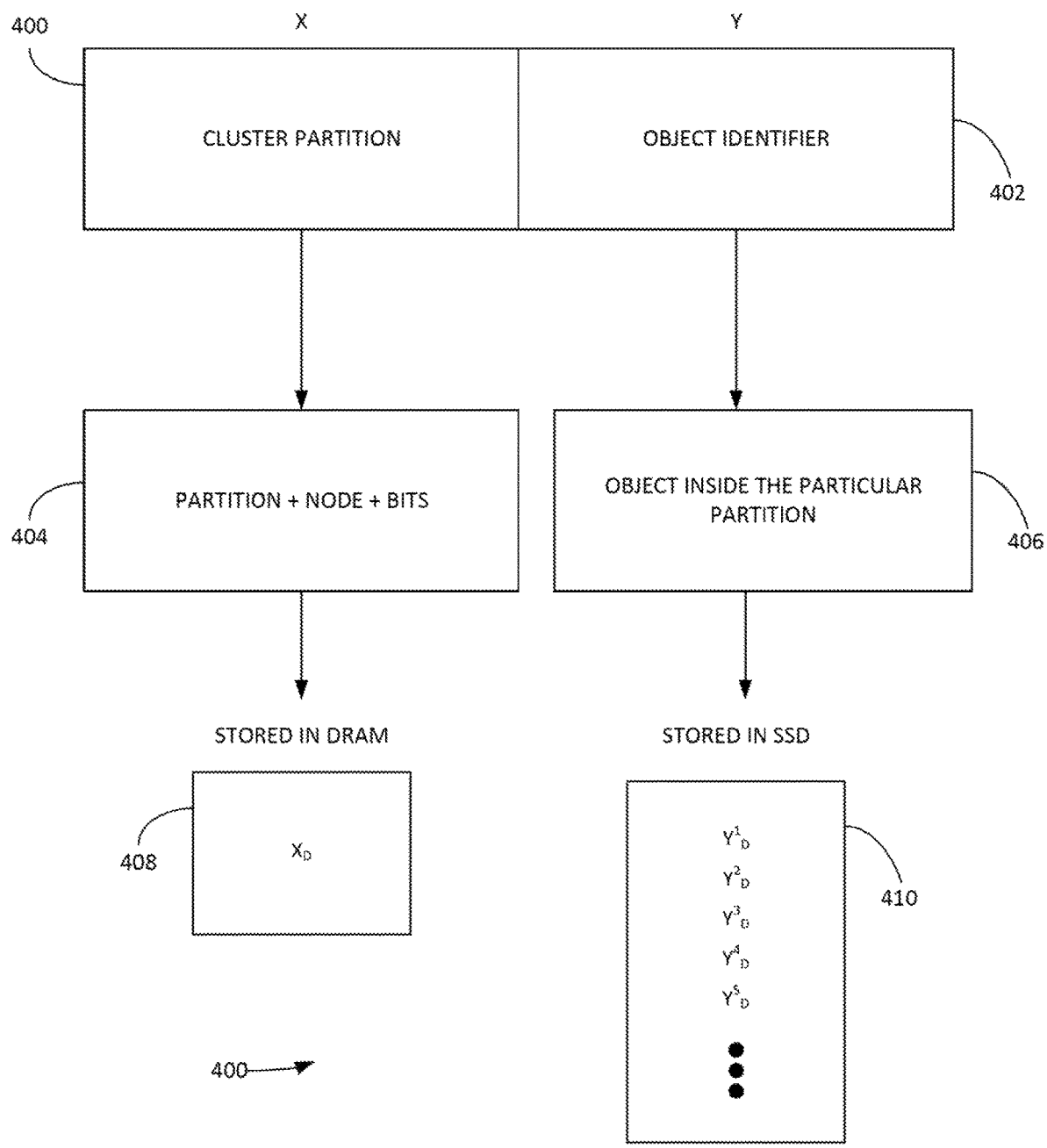
FIG. 4 illustrates an example division of a database digest, according to some embodiments.

FIG. 4 illustrates an example division of a database digest, according to some embodiments. Database digest can be split into a cluster routing portion 400 with 'x' number of bits and another portion 402 that includes the rest of digest information in 'y' bits. Cluster routing portion 400 can include information on the partition, cluster and bits 404. The other portion 402 can include information about the object with the particular partition 406 identified by cluster-routing portion. Instead of storing entire digest in DRAM, cluster routing portion 400 can be stored in DRAM memory and the other portion 402 can be stored in an SSD storage system.

In one example, cluster routing portion 400 can in include information for a particular digest 'D' listed as $X_D$ 408. $X_D$ 408 can include information for determining the node/partition within a cluster. The $Y^D_{1-n}$ object identifiers 410 can determine the object(s) inside the particular partition identified by $X_D$. Accordingly, the object identifier(s) can be batched. As with process 100, a two-level look up can be utilized. Implementation of the processes of FIGS. 1-4 can reduce requirement can now handle a petabyte database with a smaller number of servers. In one example, a database system can perform a look up operation. The database system can look up $X_D$ in memory. The database system can also obtain $Y^D_{1-n}$ in SSD storage. $X_D$ and $Y^D_{1-n}$ can then be utilized for the look up operation. $X_D$ can be used to determine the node/partition and $Y^D_{1-n}$ to determine the object inside the particular partition.

EXEMPLARY COMPUTER ARCHITECTURE AND SYSTEMS

Figure 5:
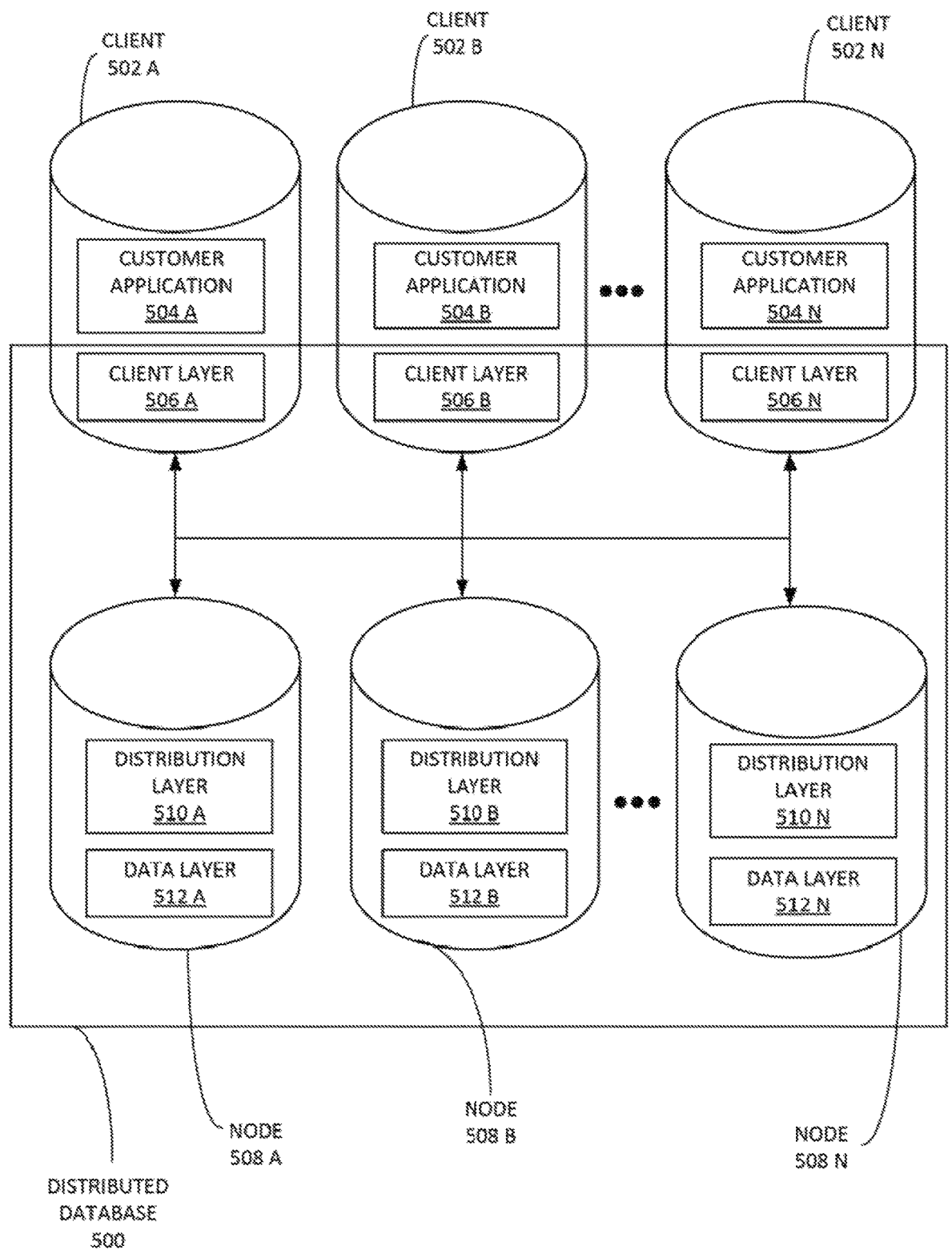
FIG. 5 shows, in a block diagram format, a distributed database system operating in a computer network according to an example embodiment.

FIG. 5 shows, in a block diagram format, a distributed database system (DDBS) 500 operating in a computer network according to an example embodiment. In some examples, DDBS 500 can be an Aerospike® database DDBS 500 can typically be a collection of databases that can be stored at different computer network sites (e.g. a server node). Each database may involve different database management systems and different architectures that distribute the execution of transactions. DDBS 500 can be managed in such a way that it appears to the user as a centralized database. It is noted that the entities of distributed database system (DDBS) 500 can be functionally connected with a PCIe interconnections (e.g. PCIe-based switches, PCIe communication standards between various machines, bridges such as non transparent bridges, etc.). In some examples, some paths between entities can be implemented with Transmission Control Protocol (TCP), remote direct memory access (SOMA) and the like.

DDBS 500 can be a distributed, scalable NoSQL database, according to some embodiments. DDBS 500 can include, inter alia, three main layers: a client layer 506 A-N, a distribution layer 510 A-N and/or a data layer 512 A-N. Client layer 506 A-N can include various DDBS client libraries. Client layer 506 A-N can be implemented as a smart client. For example, client layer 506 A-N can implement a set of DDBS application program interfaces (APIs) that are exposed to a transaction request. Additionally, client layer 506 A-N can also track duster configuration and manage the transaction requests, making any change in cluster membership completely transparent to customer application 504 A-N.

Distribution layer 510 A-N can be implemented as one or more server cluster nodes 508 A-N. Cluster nodes 508 A-N can communicate to ensure data consistency and replication across the cluster. Distribution layer 510 A-N can use a shared-nothing architecture. The shared-nothing architecture can be linearly scalable. Distribution layer 510 A-N can perform operations to ensure database properties that lead to the consistency and reliability ref the DDBS 500. These properties can include Atomicity, Consistency, isolation, and Durability.

Atomicity.

A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback, etc.).

Consistency.

This property deals with maintaining consistent data in a database system. A transaction can transform the database from one consistent state to another. Consistency falls under the subject of concurrency control.

Isolation.

Each transaction should carry out its work independently of any other transaction that may occur at the same time.

Durability.

This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, distribution layer 510 A-N can ensure that the cluster remains fully operational when individual server nodes are removed from or added to the duster. On each server node, a data layer 512 A-N can manage stored data on disk. Data layer 512 A-N can maintain indices corresponding to the data in the node. Furthermore, data layer 512 A-N be optimized for operational efficiency, for example, indices can be stored in a very tight format to reduce memory requirements, the system can be configured to use low level access to the physical storage media to further improve performance and the likes.

In some embodiments, cluster nodes 508 A-N can be an Aerospike Smart Cluster™. Cluster nodes 508 A-N can have a shared-nothing architecture (e.g. there is no single point of failure (SPOF)). Every node in the cluster can be substantially identical. For example, cluster nodes 508 A-N can start with a few nodes and then be scaled up by adding additional hardware. Cluster nodes 508 A-N can scale linearly. Data can be distributed across cluster nodes 508 A-N can using randomized key hashing (e.g. no hot spots, just balanced load). Nodes can be added and/or removed from cluster nodes 508 A-N can without affecting user response time (e.g. nodes rebalance among themselves automatically).

Auto-Discovery.

Multiple independent paths can be used for nodes discovery—an explicit heartbeat message and/or via other kinds of traffic sent to each other using the internal cluster interconnects. The discovery algorithms can avoid mistaken removal of nodes during temporary congestion. Failures along multiple independent paths can be used to ensure high confidence in the event. Sometimes nodes can depart and then join again in a relatively short amount of time (e.g. with router glitches). DDBS 500 can avoid race conditions by enforcing the order of arrival and departure events.

Balanced Distribution.

Once consensus is achieved and each node agrees on both the participants and their order within the cluster, a partitions algorithm (e.g. Aerospike Smart Partitions™ algorithm) can be used to calculate the master and replica nodes for any transaction. The partitions algorithm can ensure no hot spots and/or query volume is distributed evenly across all nodes. DDBS 500 can scale without a master and eliminates the need for additional configuration that is required in a sharded environment.

Synchronous Replication.

The replication factor can be configurable. For example, a deployments use a replication factor of two (2). The cluster can be rack-aware and/or replicas are distributed across racks to ensure availability in the case of rack failures. For writes with immediate consistency, writes are propagated to all replicas before committing the data and returning the result to the client. When a cluster is recovering from being partitioned, the system can be configured to automatically resolve conflicts between different copies of data using timestamps. Alternatively, both copies of the data can be returned to the application for resolution at that higher level. In some cases, when the replication factor can't be satisfied, the cluster can be configured to either decrease the replication factor and retain all data, or begin evicting the oldest data that is marked as disposable. If the cluster can't accept any more data, it can begin operating in a read-only mode until new capacity becomes available, at which point it can automatically begin accepting application writes.

Self-Healing and Self-Managing.

DDBS 500 and cluster nodes 508 A-N can be self-healing. If a node fails, requests can be set to automatically fail-over. When a node fails or a new node is added, the cluster automatically re-balances and migrates data. The cluster can be resilient in the event of node failure during re-balancing itself. If a cluster node receives a request for a piece of data that it does not have locally, it can satisfy the request by creating an internal proxy for this request, fetching the data from the real owner using the internal cluster interconnect, and subsequently replying to the client directly. Adding capacity can include installing and/or configuring a new server and cluster nodes 508 A-N can automatically discover the new node and re-balances data (e.g. using a Paxos consensus algorithm).

Figure 6:
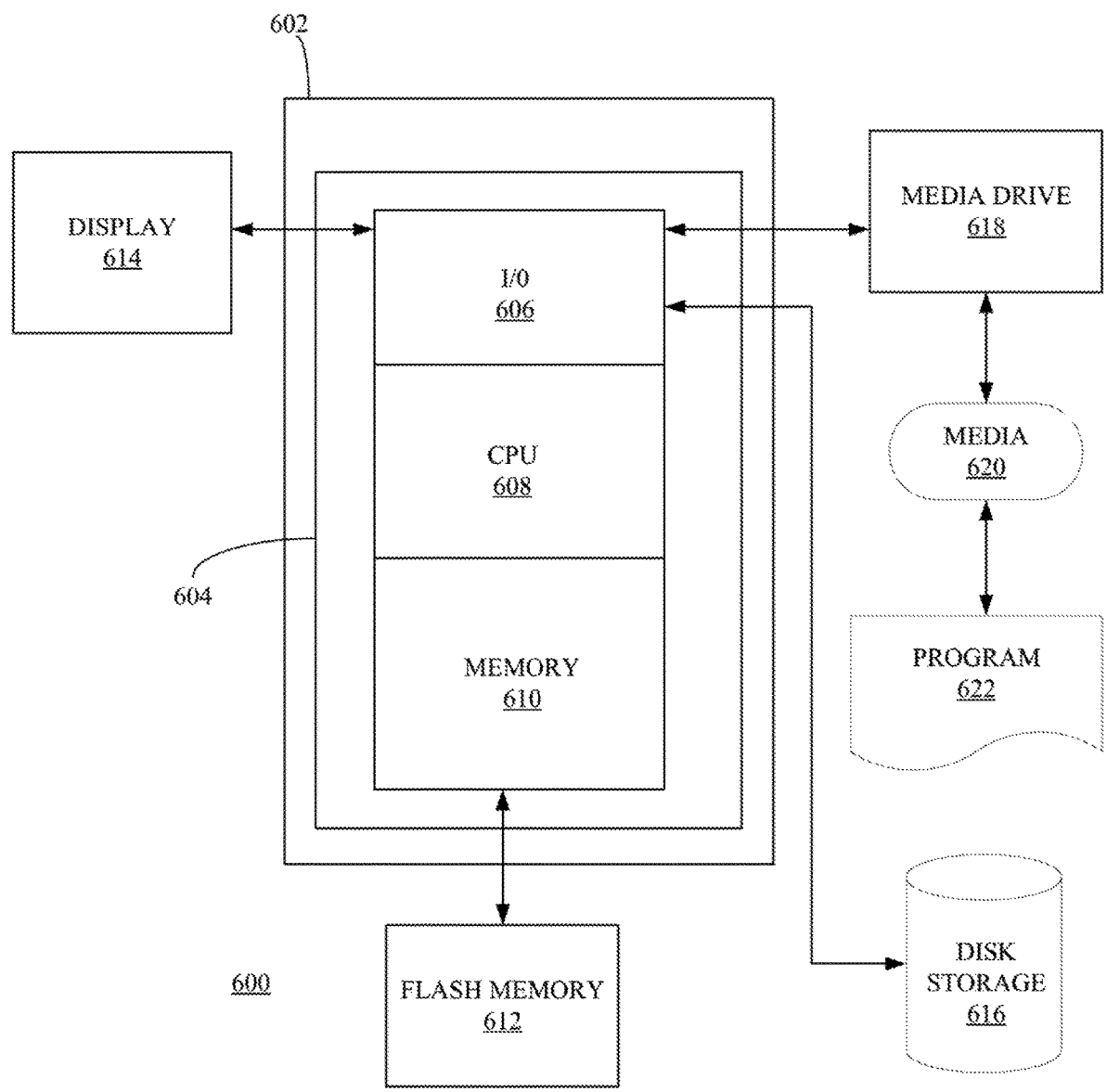
FIG. 6 is a block diagram of a sample-computing environment that can be utilized to implement various embodiments.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

DDBS 500 can have a Shared-Nothing architecture: every node in an Aerospike cluster is identical, all nodes are peers and there is no single point of failure. Data is distributed evenly across nodes in a cluster using a Smart Partitions™ algorithm. To determine where a record should go, the record key (of any size) is hashed into a 20-byte fixed length string using RIPEMD160, and the first 12 bits form a partition ID which determines which of the partitions should contain this record. The partitions are distributed equally among the nodes in the cluster, so if there are N nodes in the cluster, each node stores approximately 1/N of the data. The data can be distributed evenly (and randomly) across the nodes. There are no hot spots or bottlenecks where one node handles significantly more requests than another node.

It is noted that in an operational database, the fastest and most predictable index can be the primary key index. This index can provide the most predictable and fastest access to row information in a database. The primary key index can be a blend of distributed hash table technology with a distributed tree structure in each server. The entire key-space in a namespace (e.g. a database) can be partitioned using a robust hash function into partitions. There can be total of 4096 partitions and are equally distributed across nodes in the cluster. At the lowest level, a red-black in-memory structure can be used, similar to the data structures used in a Mem-Cache system. The primary index can be on the twenty (20) byte hash (e.g. also called digest) of the specified primary key. While this expands the key size of some records (which might have, for example, a unique 8-byte key), it can be beneficial because the code works predictably regardless of input key size, or input key distribution.

Secondary indexes can be on the non-primary key, which gives ability to model one to many relationships. Indexes are specified on a bin-by-bin (like columns in an RDBMS) basis. This can allow efficient updates and minimizes the amount of resources required to store the indexes. A data description language (DDL) can be used to determine which bins and type are to be indexed. Indexes can be created and removed dynamically through provided tools or the API.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 7:
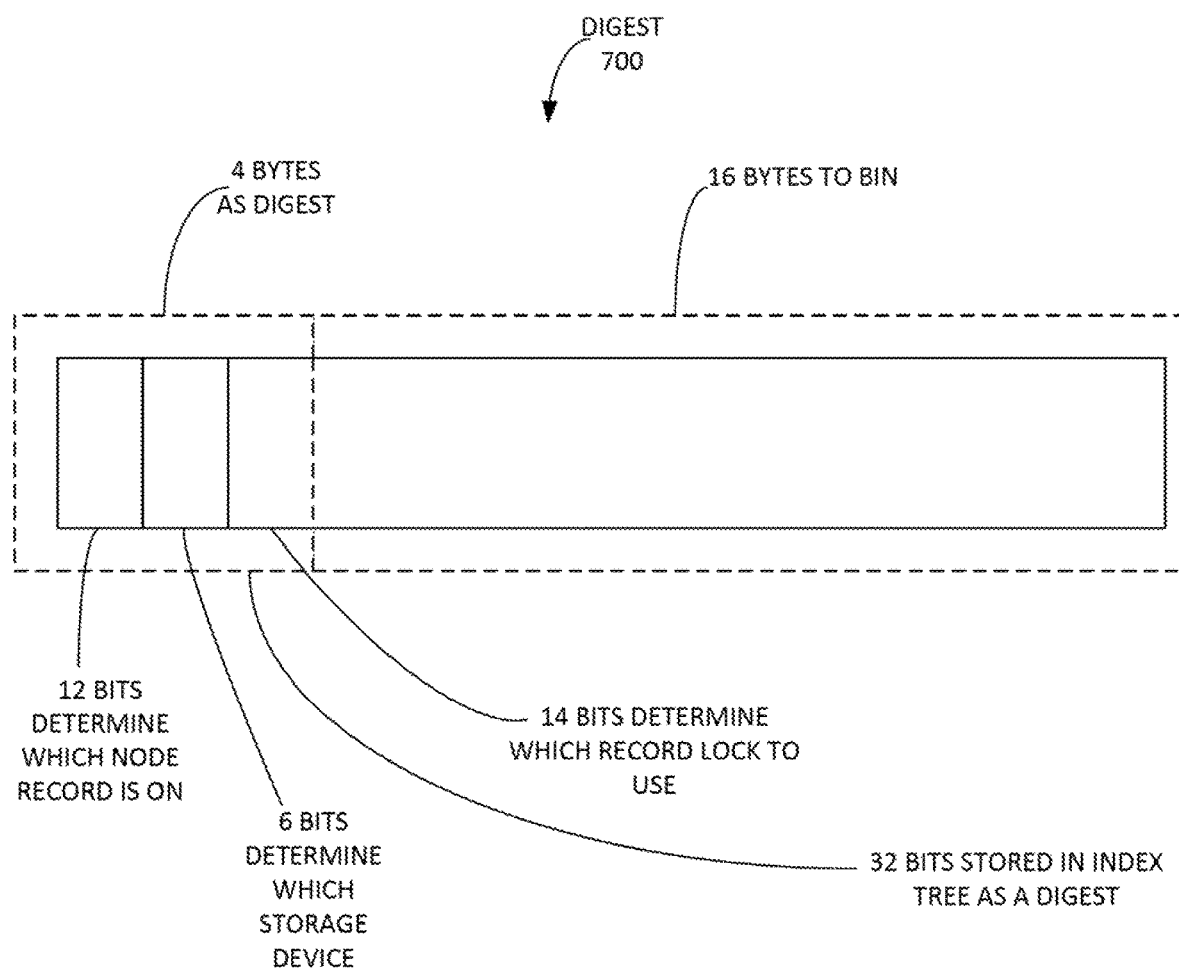
FIG. 7 illustrates an example of splitting a database digest, according to some embodiments.

FIG. 7 illustrates an example of splitting a database digest 700, according to some embodiments. For every record (e.g. a set of fields in a database related to one entity) the application can assign a unique key. The unique key can be hashed into a digest. In one example, the digest can be one-hundred and sixty (160) bits long (twenty (20) bytes). The digest can be randomized. Accordingly, starting with the same key can yield the same digest. The digest can be stored in an index tree. Each index element can be assigned a node in the index tree. The digest can be used to place and locate records.

As indicated in FIG. 7, parts of digest can serve other purposes. For example, twelve (12) bits can be used to determine which partitions to assign a record. This process can be randomized. These twelve (12) bits can tell which server node the record is on. The partition identifier of each server node can depend on how many nodes in a cluster. Two records can use the same partition identifier to be on the same node. Six (6) bits can be used to determine which storage device to store the record on. Finally, fourteen (14) bits can be used to determine which record lock to use. In one example embodiment, each record would have its own mutex (e.g. various software and hardware solutions for enforcing mutual exclusion) for protection of threads. A mutex can ensure that threads don't collide. However, as implementing mutexes have processing overhead, the database system may not utilize one mutex per record. Instead, a fixed pool of n mutexes (e.g. sixteen (16,000)) can be provided. Each record depending on the fourteen (14) bits can be assigned a particular mutex in the pool. These thirty-two (32) bits can be split from the remaining sixteen (16) bytes. The remaining sixteen (16) bytes can be stored in an appropriate bin.

The thirty-two (32) bit digest can be stored in a node in the index tree. In this way, multiple records can be 'packed together as one record' in a bin in a manner that is transparent to an application. An application can use the same client that doesn't see this happening in the server. The 'packed together' records can have the same identifiers in the thirty-two (32) bits digest. These thirty-two (32) bits can be the same for shared records. It is noted that the digest size and various portions of the section provided supra can be varied in other embodiments. In some embodiments, the generation identifier can be included in the bin/record and not in the digest. A void time can be included with the digest (e.g. as a soonest to expire identifier).

A two-level look up can be utilized to locate the relevant portion of the record. For example, the digest can be located in the appropriate node of the index tree. The digest can point to the relevant bin that includes the shared records. In one example, using a portion of the digest in the bin itself, another look up can be performed and the appropriate record located.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method of a database comprising:
    assigning a unique key to a record of the database;
    hashing the unique key into a digest, wherein the digest comprises thirty-two (32) bits;
    randomizing the digest;
    storing the digest in an index tree;
    assigning each index element to a node in the index tree;
    assigning twelve (12) bits of the digest to store information that determines which partitions to assign the record;
    assigning six (6) bits of the digest to store information that determines which storage device on which to store the record;
    assigning fourteen (14) bits of the digest to store information that determines a record lock to use on the record;
    using a two-level look up operation in the database to locate a relevant portion of the record; and
    including a void time in the thirty-two (32) bits of the digest.

2. The computer-implemented method of claim 1, wherein the record comprises a set of fields in database related to one entity.

3. The computer-implemented method of claim 2 wherein the digest comprises four (4) bytes.

4. The computer-implemented method of claim 3, wherein the digest is used to place and locate records in the database.

5. The computer-implemented method of claim 4, wherein a partition identifier of each database server node depends on a number of nodes in a database cluster that includes the database, and herein the record and another record use the partition identifier to be on a same database server node.

6. The computer-implemented method of claim 5 further comprising: providing a fixed pool of mutexes for use by records in the database.

7. The computer-implemented method of claim 6, wherein each record is assigned a specified mutex of the fixed pool of mutexes.

8. The computer-implemented method of claim 7 further comprising: assigning fourteen (14) bits of the digest is the specified mutex.

9. The computer-implemented method of claim 8 further comprising: storing the thirty-two (32) bits of the digest in the node in the index tree.

10. The computer-implemented method of claim 9, wherein multiple records are packed together as one record in a bin in a manner that is transparent to an application accessing the database.

11. The computer-implemented method of claim 10, wherein the multiple records that are packed together records use same identifiers in the thirty-two (32) bits of the digest.

12. A computer-implemented method of a database comprising:
    assigning a unique key to a record of the database;
    hashing the unique key into a digest;
    randomizing the digest;
    storing the digest in an index tree;
    assigning each index element to a node in the index tree;
    assigning a first specified number of bits of the digest to store information that determines which partitions to assign the record;
    signing a second specified number of bits of the digest to store information that determines which storage device on which to store the record;
    assigning a third specified number of bits of the digest to store information that determines a record lock to use on the record;
    wherein the digest comprises thirty-two (32) bits, wherein the first specified number of bits comprises twelve (12) bits, wherein the second specified number of bits comprises six (6), and wherein the third specified number of bits comprises fourteen (14);
    using a two-level look up operation in the database to locate a relevant portion of the record; and
    including a void time in the thirty-two (32) bits of the digest.

* * * * *